United States Patent
Faibish et al.

(10) Patent No.: US 10,007,673 B1
(45) Date of Patent: Jun. 26, 2018

(54) CLUSTER FILE SYSTEM COMPRISING DATA MOVER MODULE ARRANGED BETWEEN FRONT-END AND BACK-END FILE SYSTEMS

(71) Applicant: EMC Corporation, Hopkinton, MA (US)

(72) Inventors: Sorin Faibish, Newton, MA (US); John M. Bent, Los Alamos, NM (US); James M. Pedone, West Boylston, MA (US); Dennis Ting, Groton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 655 days.

(21) Appl. No.: 14/138,297

(22) Filed: Dec. 23, 2013

(51) Int. Cl.
*G06F 12/00* (2006.01)
*G06F 17/30* (2006.01)

(52) U.S. Cl.
CPC .............................. *G06F 17/30221* (2013.01)

(58) Field of Classification Search
CPC ........... G06F 11/2092; G06F 15/17331; G06F 17/30233; G06F 3/061; G06F 11/3034; G06F 17/30079; G06F 17/30088; G06F 17/30224; H04L 67/1097; H04L 67/06
See application file for complete search history.

(56) References Cited

U.S. PATENT DOCUMENTS

2010/0186014 A1* 7/2010 Vaghani .................. G06F 3/06
718/101

2012/0310892 A1* 12/2012 Dam .................. G06F 17/30156
707/659
2013/0159364 A1* 6/2013 Grider ............... G06F 17/30224
707/826

(Continued)

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.

(Continued)

*Primary Examiner* — Jason Liao
*Assistant Examiner* — Berhanu Mitiku
(74) *Attorney, Agent, or Firm* — Ryan, Mason & Lewis, LLP (57) ABSTRACT

A cluster file system includes a front-end file system comprising a hierarchical storage management application programming interface (API), a back-end file system, and a data mover module arranged between the front-end and back-end file systems and adapted for communication with the hierarchical storage management API of the front-end file system. The data mover module is configured to control movement of data between the front-end file system and the back-end file system responsive to information received via the hierarchical storage management API. For example, in some embodiments, the data mover module splits a given file received from the front-end file system into multiple smaller files for storage in the back-end file system and associates with each of the smaller files a corresponding file extension from a designated namespace to permit reconstruction of the given file upon retrieval of the smaller files from the back-end file system.

20 Claims, 6 Drawing Sheets

(56) References Cited

U.S. PATENT DOCUMENTS

2014/0237614 A1* 8/2014 Irvine ................. G06F 21/6218
  726/26
2015/0143064 A1* 5/2015 Bhargava ............ G06F 11/1451
  711/162

OTHER PUBLICATIONS

Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.

* cited by examiner

CLUSTER FILE SYSTEM COMPRISING DATA MOVER MODULE ARRANGED BETWEEN FRONT-END AND BACK-END FILE SYSTEMS

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement both a front-end file system and a back-end file system, with an intermediate data mover module controlling movement of data between the front-end and back-end file systems, so as to provide significant improvements relative to conventional arrangements. For example, one or more of the illustrative embodiments are configured so as to allow a front-end Lustre file system to interact in a particularly efficient manner with a back-end file system comprising a scale-out network attached storage cluster, thereby obtaining the performance advantages of one or more tiers of object storage servers as well as the storage capacity and cost benefits associated with one or more tiers of scale-out network attached storage. Accordingly, implementation of scale-out network attached storage is facilitated in supercomputers and other complex computing environments that utilize Lustre file systems.

In one embodiment, a cluster file system includes a front-end file system comprising a hierarchical storage management application programming interface (API), a back-end file system, and a data mover module arranged between the front-end and back-end file systems and adapted for communication with the hierarchical storage management API of the front-end file system. The data mover module is configured to control movement of data between the front-end file system and the back-end file system responsive to information received via the hierarchical storage management API.

The data mover module is illustratively configured to split a given file received from the front-end file system into multiple smaller files for storage in the back-end file system, and to associate with each of the smaller files a corresponding file extension from a designated namespace so as to permit reconstruction of the given file upon retrieval of the smaller files from the back-end file system.

By way of example, in some embodiments the data mover module may comprise a plurality of server nodes that are synchronized with one another utilizing a message passing interface (MPI) protocol. In other embodiments, the data mover module may be implemented at least in part using a virtual layer of a parallel log-structured file system (PLFS). Numerous other implementations are possible for the data mover module.

As noted above, illustrative embodiments described herein provide significant improvements relative to conventional arrangements. In some of these embodiments, use of a storage tier implemented using object storage servers in conjunction with a disk storage tier implemented using nodes of a scale-out network attached storage cluster allows dynamic balancing of storage capacity and IO throughput requirements in a cluster file system, thereby allowing particular levels of performance to be achieved at a significantly lower cost than would otherwise be possible. Similar improvements are provided in alternative embodiments using other numbers and types of storage tiers.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
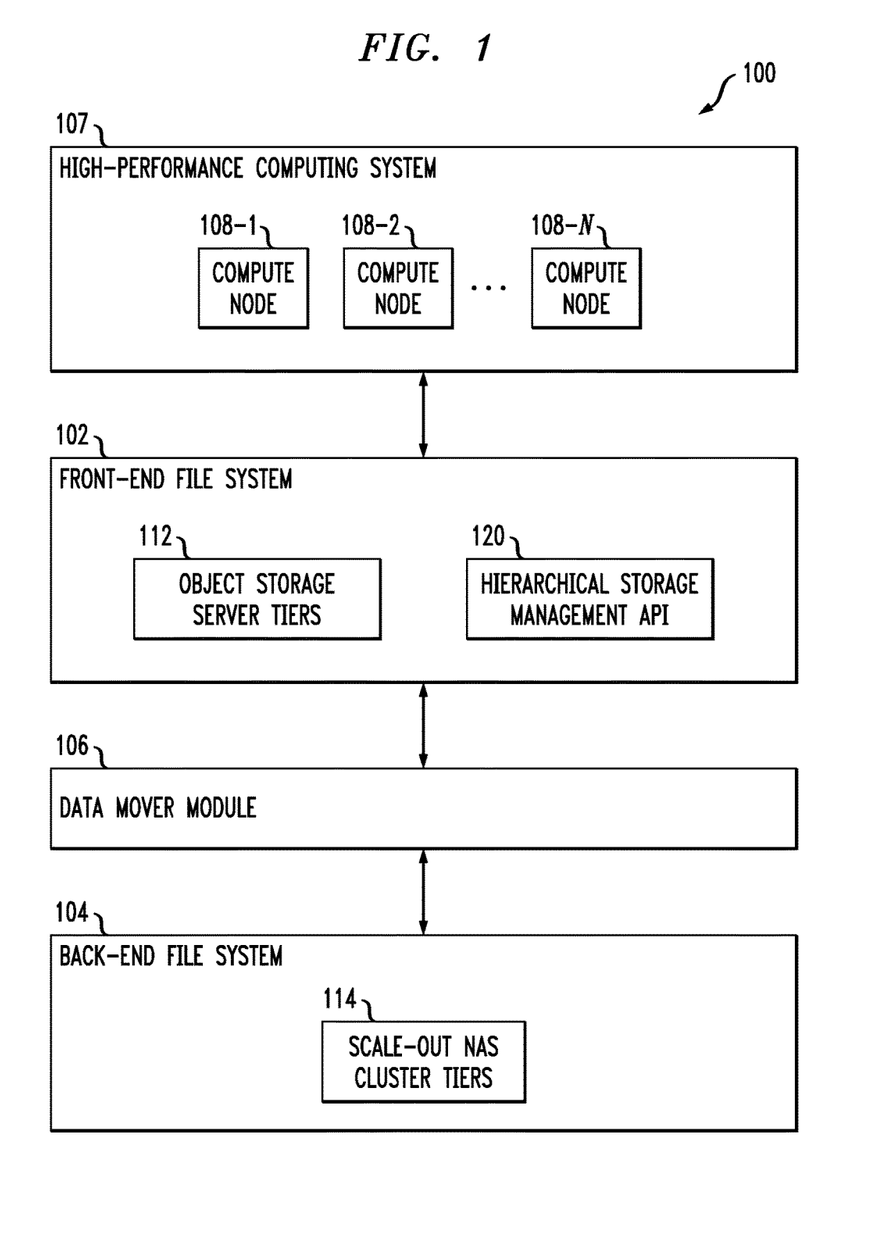
FIG. 1 is a block diagram of an information processing system implementing a cluster file system comprising a data mover module arranged between a front-end file system and a back-end file system in an illustrative embodiment of the invention.

FIG. 1 shows an information processing system 100 configured in accordance with an illustrative embodiment of the present invention. The information processing system 100 comprises a front-end file system 102, a back-end file system 104 and a data mover module 106 arranged between the front-end and back-end file systems 102 and 104. The information processing system 100 further comprises an HPC system 107 comprising a plurality of compute nodes 108-1, 108-2, . . . 108-N. The compute nodes 108 of the HPC system 107 are coupled to the front-end file system 102, but may additionally or alternatively be coupled to or otherwise associated with other system components in other embodiments. For example, in some embodiments, the data mover module 106 can be implemented at least in part utilizing software running on the compute nodes 108.

In the present embodiment, the front-end file system 102 and back-end file system 104 are assumed to be of different types. More particularly, the front-end file system 102 comprises one or more object storage server or OSS tiers 112 and the back-end file system comprises one or more scale-out network attached storage or scale-out NAS tiers 114. The OSS tiers 112 are illustratively implemented using a Lustre file system, and the scale-out NAS tiers 114 are illustratively implemented using nodes of a scale-out NAS cluster.

The front-end file system 102 and back-end file system 104 in the present embodiment are therefore associated with respective different sets of one or more hierarchical storage tiers for use in hierarchical storage management.

The front-end file system 102 illustratively comprises a hierarchical storage management (HSM) API 120. Such an API may comprise a Lustre HSM API of the type implemented in version 2.5 of the Lustre file system, although other types of HSM APIs may be used in other embodiments. It should be noted in this regard that the term "hierarchical storage management API" as used herein is intended to be broadly construed, as encompassing any API through which a data mover module is provided with information that allows it to control movement between front-end and back-end file systems, and are not limited to Lustre APIs or other APIs associated with specific front-end file systems.

Conventional aspects of Lustre file systems suitable for use in implementing the front-end file system 102 are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

The scale-out NAS cluster tiers 114 of the back-end file system 104 and other scale-out NAS clusters referred to herein may be implemented, for example, using Isilon storage platforms, such as storage platforms comprising Isilon platform nodes and associated accelerators in the S-Series, X-Series and NL-Series product lines, commercially available from EMC Corporation of Hopkinton, Mass.

Other types of storage products that may be used to implement portions of one or more of the file systems 102 and 104 of the system 100 include storage arrays such as VNX® and Symmetrix VMAX®, both also commercially available from EMC Corporation. A variety of other storage products may be utilized to implement at least a portion of a front-end or back-end file system.

The data mover module 106 is adapted for communication with the HSM API 120 of the front-end file system 102. More particularly, the data mover module 106 is configured to control movement of data between the front-end file system 102 and the back-end file system 104 responsive to information received via the HSM API 120.

The movement of data includes movement of data between at least one of the OSS tiers 112 and one or more of the scale-out NAS cluster tiers 114, and may additionally or alternatively involve movement of data between multiple OSS tiers 112 or between multiple scale-out NAS cluster tiers 114.

By way of example, multiple OSS tiers 112 in some embodiments include at least first and second storage tiers comprising respective disjoint subsets of a plurality of OSSs, with the OSSs in the first storage tier being configured to interface with object storage targets or OSTs of a first type and the OSSs in the second storage tier being configured to interface with OSTs of a second type different than the first type. The first and second different types of OSTs provide respective different levels of performance, as in an arrangement in which the OSTs of the first type comprise respective flash storage devices and the OSTs of the second type comprise respective disk storage devices.

The different storage tiers in a given set of multiple storage tiers in this embodiment comprise different types of storage devices having different performance characteristics. For example, each of a plurality of OSS servers of a given one of the OSS tiers 112 is illustratively configured to interface with a corresponding OST in the form of a flash storage device, and each of the scale-out NAS nodes of a given one of the scale-out NAS storage tiers 114 comprises a disk storage device.

The flash storage devices of the given OSS tier 112 are generally significantly faster in terms of read and write access times than the disk storage devices of the given scale-out NAS cluster tier 114. The flash storage devices are therefore considered "fast" devices in this embodiment relative to the "slow" disk storage devices. Accordingly, the hierarchical storage management may be characterized in the present embodiment as having a "fast" storage tier 112 and a "slow" storage tier 114, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices may be implemented, by way of example, using respective flash Peripheral Component Interconnect Express (PCIe) cards or other types of memory cards installed in a computer or other processing device that implements the corresponding OSS. Numerous alternative arrangements are possible. Also, a variety of other types of non-volatile or volatile memory in any combination may be used in place of the flash storage devices. Examples of alternatives to flash storage devices that may be used as respective OSTs in other embodiments of the invention include non-volatile memories such as magnetic random access memory (MRAM) and phase change random access memory (PC-RAM).

The flash storage devices of the given OSS tier 112 generally provide higher performance than the disk storage devices of the given scale-out NAS cluster tier 114 but the disk storage devices generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

Also, such an arrangement allows the system 100 to obtain the performance advantages of an OSS storage tier as well as the storage capacity and cost benefits associated with use of scale-out network attached storage. Accordingly, implementation of scale-out network attached storage is facilitated in supercomputers and other complex computing environments that utilize Lustre file systems.

In the FIG. 1 embodiment, as in other embodiments described herein, an OSS tier is also referred to as a "fast" storage tier and a scale-out NAS cluster tier is also referred to as a "slow" storage tier. Again, the terms "fast" and "slow" in this context are relative terms and should not be construed as requiring any particular absolute performance levels.

These particular tiering arrangements should be considered exemplary only, and numerous alternative arrangements of two or more storage tiers may be utilized in providing at least a subset of the OSS tiers 112 of the front-end file system 102 and scale-out NAS cluster tiers 114 of the back-end file system 104 in other embodiments. For example, additional storage tiers may be implemented between the front-end file system 102 and the HPC system 107 utilizing one or more burst buffer appliances.

A given such burst buffer appliance is generally configured to accelerate IO operations between the compute nodes 108 and the front-end file system 102 by storing associated data in its burst buffers. The term "burst buffer appliance" as used herein is intended to be broadly construed, so as to encompass any network appliance or other arrangement of hardware and associated software or firmware that collectively provides multiple burst buffers implemented using high-speed storage devices.

Thus, a burst buffer appliance may be viewed as providing a high-speed memory that serves as a buffer between the compute nodes 108 of the HPC system 107 and the front-end file system 102, for storing bursts of data associated with different types of IO operations.

Other embodiments may include multiple burst buffer appliances, with each such appliance adapted for coupling between at least a portion of the front-end file system 102 and one or more compute nodes 108 of the HPC system 107.

In still further embodiments, one or more burst buffer appliances may be incorporated into the front-end file system 102 itself and utilized to implement at least a portion of the OSS tiers 112.

It is also to be appreciated that the use of OSS tiers 112 and scale-out NAS cluster tiers 114 is not a requirement, and numerous additional or alternative file systems can be used in implementing at least portions of the front-end file system 102 and the back-end file system 104. For example, file systems such as Hadoop Distributed File System (HDFS) or General Parallel File System (GPFS) can be used, possibly in combination with a Lustre file system or other object stores such as Ceph. Various other combinations of these and other file systems can also be used in other embodiments.

In the present embodiment, the front-end file system 102 and the back-end file system 104 collectively provide an exemplary implementation of what is more generally referred to herein as a cluster file system. As indicated above, portions of a cluster file system may be implemented as a distributed file system such as HDFS, a parallel file system such as GPFS or as a combination of a Lustre file system with HDFS, GPFS or other parallel or distributed file systems. The term "cluster file system" as used herein is therefore intended to be broadly construed, so as to encompass, for example, Lustre file systems, distributed file systems, parallel file systems, or various combinations thereof, as well as other types of file systems implemented using one or more clusters of processing devices.

Although only a single back-end file system is shown in the FIG. 1 embodiment, other embodiments may include multiple back-end file systems with the data mover module 106 being configured to control movement of data between the front-end file system and each of the back-end file systems responsive to information received via the HSM API 120. For example, the multiple back-end file systems may comprise one or more object stores and one or more scale-out NAS clusters.

The HPC system 107 may comprise, for example, a supercomputer. Such an HPC system is an example of what is more generally referred to herein as a "computer system." Each of the compute nodes 108 may comprise or otherwise correspond to one or more clients of the information processing system 100. Accordingly, one or more clients may be implemented as respective components of each of the compute nodes 108. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 108 of the HPC system 107.

For example, a client may comprise an application running on a given one of the compute nodes 108. In such an arrangement, the data mover module 106 may be configured to control movement of data between the storage tiers 112 and 114 of the respective front-end and back-end file systems 102 and 104 in order to facilitate achievement of desired levels of performance by the clients.

The data mover module 106 is illustratively shown as being implemented externally to the HPC system 107 in the present embodiment, but in other embodiments is implemented at least in part on the compute nodes 108.

Numerous other types and arrangements of cluster file systems and computer systems may be used in other embodiments of the invention.

Although some embodiments utilize one or more burst buffer appliances in the front-end file system 102, or coupled between the front-end file system 102 and the compute nodes 108 of the HPC system 107, use of burst buffer appliances is optional and may be eliminated in other embodiments.

As indicated above, the data mover module 106 controls movement of data between storage tiers of the front-end and back-end file systems 102 and 104, taking into account current operating conditions and other factors and based at least in part on information received via the HSM API of the front-end file system 102.

Data movement determinations made by the data mover module 106 are illustratively performed in cooperation with one or more job schedulers of the information processing system 100. For example, data movement determinations can be made at least in part utilizing a job scheduler of the system 100 responsive to IO requests received in the job scheduler from one or more applications running on the compute nodes 108. Such IO requests and other similar requests referred to herein may be configured, for example, in accordance with standard portable operating system interface (POSIX) system calls. Data movement determinations can be implemented differently for each of a plurality of processing jobs, thereby effectively allowing dynamic data migration on a per-job basis.

The data mover module 106 can also be configured to update stored metadata responsive to movement of data between the storage tiers 112 and 114.

The data mover module 106 in some embodiments comprises a plurality of server nodes that are synchronized with one another utilizing a message passing interface (MPI) protocol. The server nodes can be implemented using the compute nodes 108, or other arrangements of one or more processing devices, including, for example, one or more processing devices that are each coupled to the front-end file system 102, the back-end file system 104 and the HPC system 107. A data mover module arrangement of this type is considered an example of an embodiment in which the data mover module is arranged between the front-end and back-end file systems. In other words, additional coupling or other association of the data mover module 106 with the HPC system 107 does not prevent the data mover module from being effectively arranged between the front-end file system 102 and the back-end file system 104.

As will be described in greater detail below, the data mover module 106 in some embodiments is configured to split a given file received from the front-end file system 102 into multiple smaller files for storage in the back-end file system 104 and to associate with each of the smaller files a corresponding file extension from a designated namespace so as to permit the given file to be reconstructed upon retrieval of the smaller files from the back-end file system 104. Such file-splitting effectively allows a Lustre-based implementation of the front-end file system 102 to utilize Isilon platform nodes or other types of scale-out NAS clusters as HSM targets, thereby providing enhanced flexibility in storage tiering and a better balance between performance and cost in the information processing system 100.

This is in contrast to conventional practice, where scale-out NAS clusters that have file size limitations often cannot be used as a Lustre file system HSM target, because the Lustre file system often has file sizes well above the file size limitations of the scale-out NAS clusters. For example, some Isilon platform nodes have file size limits of only 4 terabytes (TB), while Lustre file systems often store files with sizes on the order of 10-50 TB or more.

Accordingly, under this conventional practice, it is not possible to utilize Isilon platform nodes as HSM targets of a Lustre file system. Embodiments of the present invention advantageously overcome this significant deficiency of conventional practice, thereby allowing Isilon platform nodes, other scale-out NAS cluster nodes and other types of back-end file systems to be used as HSM targets.

Similar advantages are obtained using alternative implementations of the data mover module 106. For example, in other embodiments, the data mover module is implemented at least in part utilizing a virtual layer of a parallel log-structured file system (PLFS). In such an embodiment, the virtual layer may comprise comprises PLFS middleware configured to migrate files between the front-end and back-end file systems.

Although the data mover module 106 is illustratively shown as being separate from the file systems 102 and 104 in the figure, components such as the PLFS middleware are assumed to be implemented using the OSSs of the OSS tiers 112 as well as scale-out NAS nodes of the scale-out NAS cluster tiers 114. For example, each of the sets of storage tiers 112 and 114 may be viewed as implementing a corresponding virtual layer of PLFS functionality within the cluster file system of the information processing system 100.

A given such PLFS virtual layer represents at least a portion of what is more generally referred to herein as a virtual file system. It should be understood that other types of virtual file systems can be used to implement at least a portion of the data mover module 106 in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the front-end file system 102, the back-end file system 104, the data mover module 106 and the HPC system 107 comprising compute nodes 108 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the front-end file system 102, back-end file system 104 and compute nodes 108, the data mover module 106 in other embodiments may be implemented at least in part within one or more of these system elements. It is also to be appreciated that a given embodiment of the information processing system 100 may include multiple instances of one or more of the front-end file system 102, the back-end file system 104, the data mover module 106 and the HPC system 107 comprising the set of N compute nodes 108, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other systems comprising a data mover module arranged between a front-end file system and a back-end file system.

In step 200, a data mover module is configured for arrangement between a front-end file system and a back-end file system. With reference to the FIG. 1 embodiment, the data mover module 106 is implemented between the front-end file system 102 and the back-end file system 104. The data mover module 106 in the FIG. 1 embodiment is not shown as being directly coupled to the HPC system 107. However, in other embodiments, the data mover module is implemented at least in part on the compute nodes 108 themselves, for example, using PLFS clients running on respective ones of the compute nodes.

In step 202, the data mover module is adapted for communication with an IISM API of the front-end file system. In the FIG. 1 embodiment, the data mover module 106 is adapted for communication with the HSM API 120 of the front-end file system 102.

In step 204, movement of data between the front-end file system and the back-end file system is controlled responsive to information received in the data mover module via the HSM API. In the FIG. 1 embodiment, the data mover module 106 controls movement of data between the OSS tiers 112 and scale-out NAS cluster tiers 114 based on information received via the HSM API 120. The term "data movement" as used in this and other contexts herein is intended to be broadly construed, so as to encompass data migration as well as other types of movement of data between storage tiers.

By way of example, the data mover module 106 may be configured in the form of a multi-threaded application that communicates with the HSM API 120. The information received in the data mover module 106 via the HSM API illustratively comprises commands to move files from the front-end file system 102 to the back-end file system 104 and to restore files from the back-end file system 104 to the front-end file system 102.

As indicated previously, in conjunction with the movement of data between one or more storage tiers 112 of the front-end file system 102 and one or more storage tiers 114 of the back-end file system 104, the data mover module 106 may split a given file received from the front-end file system 102 into multiple smaller files for storage in the back-end file system 104. For example, such splitting may be necessary due to file size restrictions in the nodes of the scale-out NAS cluster tiers 114 of the back-end file system 104.

If a given file from the front-end file system 102 is split for storage in the back-end file system 104, the data mover module 106 associates with each of the smaller files a corresponding file extension from a designated namespace so as to permit the given file to be reconstructed upon retrieval of the smaller files from the back-end file system 104.

Similar splitting arrangements may be applied to file segments representing respective portions of a given file. For example, a given file may be stored in an OSS tier 112 as multiple segments with each segment residing in a different OST of the OSS tier. The segments in such an arrangement may each be split for storage in the nodes of a scale-out NAS cluster tier, again depending on the segment size relative to the file size restrictions associated with the scale-out NAS nodes.

Also, in conjunction with splitting of files or file segments, one or more metadata files are also generated and stored in the back-end file system 104. For example, a given metadata file may indicate the manner in which split files or split file segments are distributed across multiple nodes of a given scale-out NAS cluster tier 114.

It should be noted that file segments and sub-segments are intended to fall within the general term "file" as broadly used herein. Such segments and sub-segments are identified by unique file names using file extensions from a designated namespace.

The manner in which a given file is stored across the nodes of the scale-out NAS cluster tier 114 will generally depend upon the file size. For example, in an arrangement in which the given file is stored as multiple file segments across respective multiple OSTs of an OSS tier 112, the layout of the file segments over the OSTs can be preserved in the back-end file system 104 if the sizes of the file segments are less than or equal to the maximum file size permitted in the nodes of a scale-out NAS cluster tier 114.

A round robin distribution of the file segments across the scale-out NAS cluster nodes can be used. Thus, for example, if there are three scale-out NAS cluster nodes A, B and C and six file segments denoted SF0, SF1, SF2, SF3, SF4 and SF5, file segments SF0 and SF3 are stored on scale-out NAS cluster node A, file segments SF1 and SF4 are stored on scale-out NAS cluster node B, and file segments SF2 and SF5 are stored on scale-out NAS cluster node C, in accordance with the round robin distribution. The file layout is reflected in metadata stored in a corresponding metadata file which may be archived within the back-end file system. Other types of distributions of file segments can be used in other embodiments.

If the file segments stored on the respective Lustre OSTs are larger than the maximum file size permitted in the nodes of the scale-out NAS cluster tier 114, the file segments can each be split into two or more sub-segments that satisfy the file size limitations of the scale-out NAS cluster nodes. Again, round robin distribution or other types of distribution can be used in storing the sub-segments over the scale-out NAS cluster nodes.

By way of example, the above-noted file extension may comprise an 8-digit suffix representing a 32-bit number. Thus, a given file "testfile" stored on the front-end file system 102 may be separated into multiple smaller files that use the following extensions:

testfile.##HSML##0.00000000
testfile.##HSML##0.00000001
testfile.##HSML##0.00000002
. . .

In the above example, the notation HSML denotes hierarchical storage management for Lustre. Other similar notation can be used for other types of front-end file systems, such as HSMG denoting hierarchical storage management for GPFS. Similar file extensions may be used to identify sub-segments of individual segments of a given file stored as multiple segments on the front-end file system 102. For example, if each of the smaller files in the previous example is a file segment that is itself separated into multiple sub-segments, the file extensions can be modified in the following manner:

testfile.##HSML##. 00000000.0
testfile.##HSML##0.00000000.1
testfile.##HSML##0.00000000.2
. . .
testfile.##HSML##0.00000001.0
testfile.##HSML##0.00000001.1
testfile.##HSML##0.00000001.2
. . .
testfile.##HSML##0.00000002.0
testfile.##HSML##0.00000002.1
testfile.##HSML##0.00000002.2
. . .

In addition, this splitting facilitates the balancing of performance across the multiple nodes of a scale-out NAS cluster tier 114.

Further examples of file and file segment splitting of this type will be described in more detail below in conjunction with the illustrative embodiments of FIGS. 4 and 5.

It was noted above that data stored in the file systems 102 and 104 is migrated between multiple storage tiers as necessary to facilitate achievement of desired performance levels. For example, in the FIG. 1 embodiment, the data mover module 106 may migrate data between multiple storage tiers of the front-end and back-end file systems in order to achieve desired levels of IO performance responsive to requests received from one or more clients. Data migration and other data movement determinations may be based at least in part on monitoring of current levels of performance within the system 100. Such monitoring in the FIG. 1 embodiment is assumed to be performed under the direction of the front-end file system 102 and may involve the use of sensors of a sensor network, or various other types of monitoring arrangements. The particular types of operating conditions and other factors that are monitored can be varied depending upon the needs of a given implementation.

The movement of a given data file, data object or other set of data between first and second storage tiers may be controlled at least in part based on information provided by a client comprising an application running on a corresponding compute node.

When PLFS is used to implement the data mover module 106, the data mover module illustratively comprises PLFS middleware including multiple synchronization daemons associated with respective OSSs of at least one of the storage tiers 112. A given such synchronization daemon is triggered by at least one of a read operation and a write operation associated with a client comprising an application running on a corresponding compute node.

Metadata associated with moved data is updated to reflect the movement between storage tiers. In the FIG. 1 embodiment, the updating of such metadata is assumed to be performed at least in part under the control of the data mover module 106.

If the desired levels of performance have not been achieved, the manner in which the data is stored across the storage tiers 112 and 114 can be altered. In the context of the FIG. 1 embodiment, this generally involves the data mover module 106 executing an alternative storage arrangement responsive to information received via the HSM API 120, so as to facilitate achievement of the desired levels of performance in the system 100.

If the desired levels have been achieved, the data mover module 106 continues to control the flow of data between the front-end and back-end file systems. The above-noted determination as to whether or not desired levels of performance have been achieved is then repeated periodically and further adjustment of the manner in which the data are distributed over the storage tiers 112 and 114 is made by the data mover module 106 as needed, possibly in response to changing operating conditions and other factors.

Figure 2:
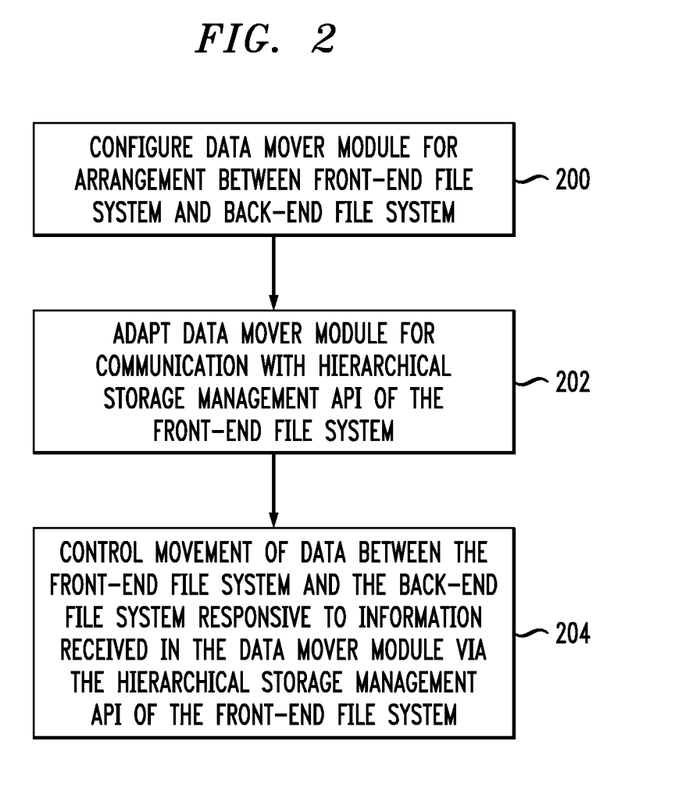
FIG. 2 is a flow diagram of an exemplary process implemented using the data mover module in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving the user of a data mover module arranged between a front-end file system and a back-end file system. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Other illustrative embodiments will now be described in more detail with reference to FIGS. 3, 4 and 5.

Figure 3:
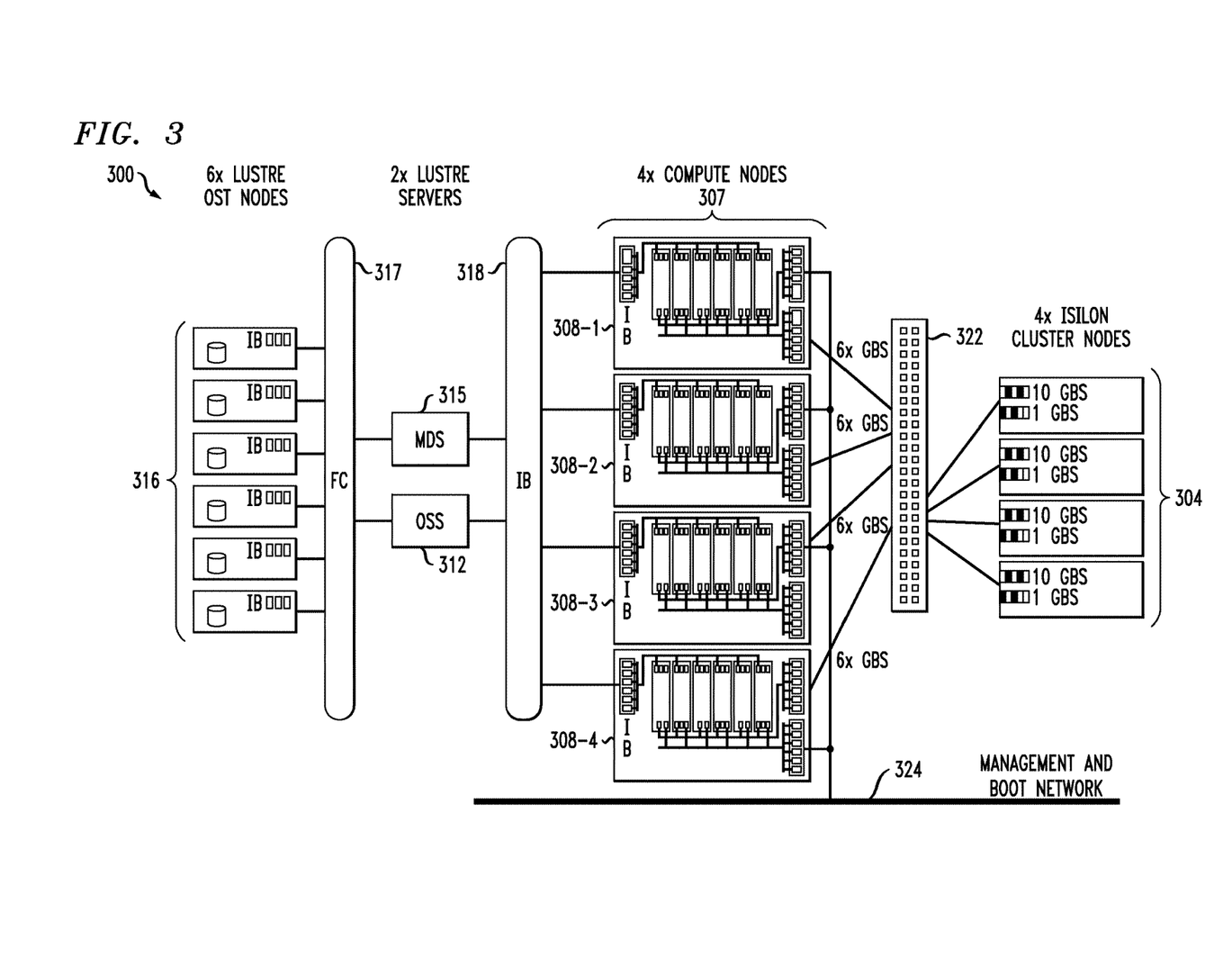
FIG. 3 shows another embodiment of an information processing system implementing a cluster file system comprising a data mover module arranged between a front-end file system and a back-end file system.

FIG. 3 shows another information processing system 300 that includes a cluster file system implemented using a data mover module implemented between a front-end file system and a back-end file system.

In this embodiment, information processing system 300 includes a back-end file system 304 comprising a scale-out NAS cluster having four Isilon platform nodes, collectively referred to as an Isilon cluster. The system 300 comprises an HPC system 307 that includes four compute nodes 308-1, 308-2, 308-3 and 308-4. The data mover module in this embodiment is not explicitly shown, but is assumed to be implemented on the compute nodes 308 of the HPC system 307.

The data mover module is arranged between a front-end file system and the back-end file system 304 by virtue of its placement in the HPC system 307. The front-end file system comprises a Lustre file system that includes a Lustre OSS 312, a Lustre metadata server or MDS 315 and six Lustre OSTs 316. The OSTs are coupled to the Lustre servers 312 and 315 via Fibre Channel (FC) connections 317 and the Lustre servers 312 and 315 are coupled to the compute nodes 308 via InfiniBand (IB) connections 318. The compute nodes 308 are coupled to the back-end file system 304 via an IB switch 322. The compute nodes are also coupled to a management and boot network 324. The data mover module in this embodiment generally functions in substantially the same manner as previously described in conjunction with FIGS. 1 and 2.

Figure 4:
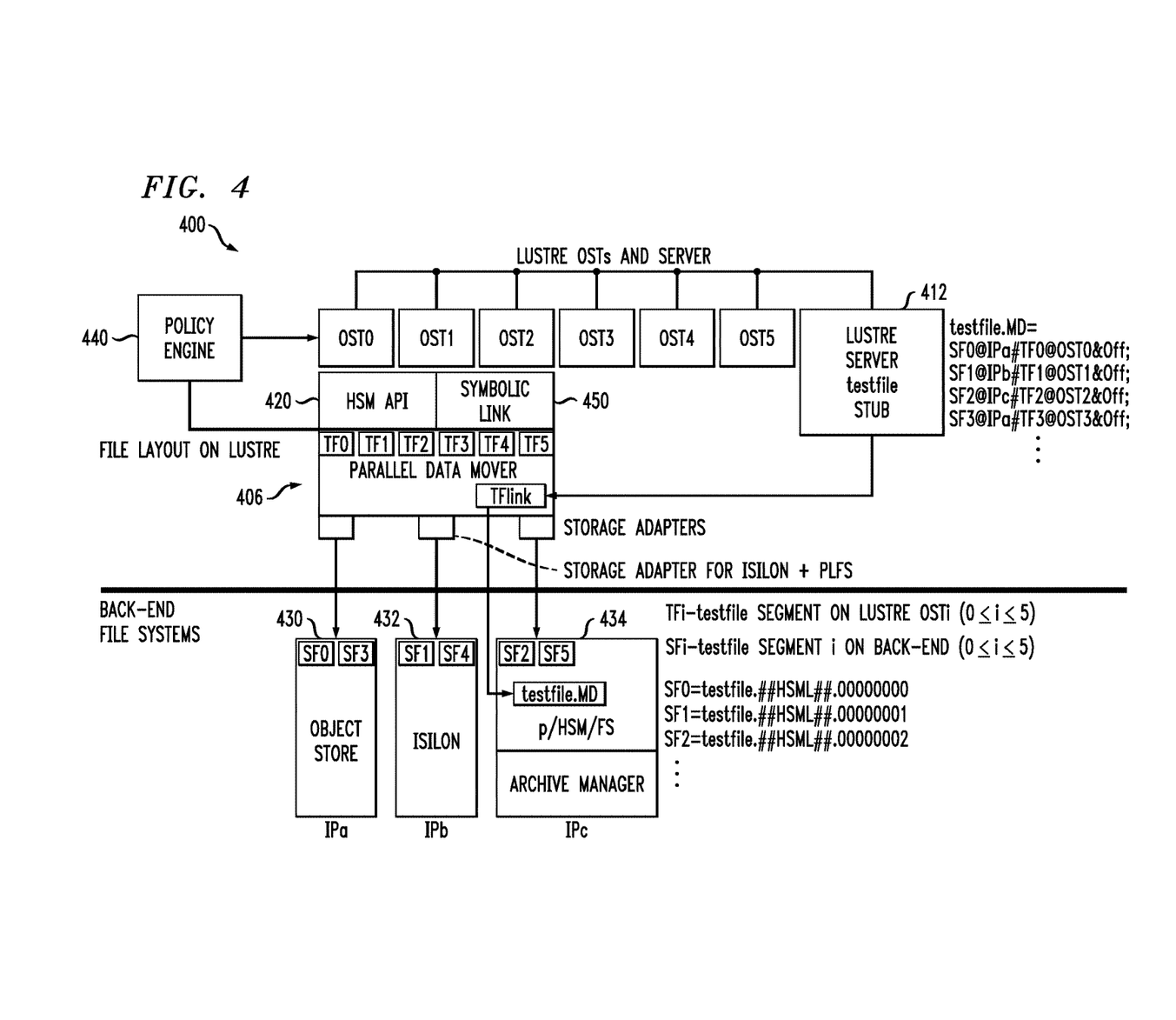
FIGS. 4 and 5 illustrate exemplary file splitting arrangements in another embodiment of an information processing system implementing a cluster file system comprising a data mover module arranged between a front-end file system and a back-end file system.

Referring now to FIG. 4, an information processing system 400 comprises a data mover module 406 arranged between a front-end file system and multiple back-end file systems. The front-end file system is implemented as a Lustre file system that includes an OSS storage tier. The OSS storage tier in this embodiment comprises a Lustre OSS 412 coupled to a plurality of Lustre OSTs. The Lustre OSTs are more particularly denoted in the figure as OST0, OST1, OST2, OST3, OST4 and OST5. The front-end file system communicates with the data mover module 406 via an HSM API 420.

The back-end file systems more particularly comprise an object store 430, a scale-out NAS cluster 432 in the form of an Isilon platform, and an additional file system 434 denoted p/HSM/FS and having an associated archive manager. Numerous alternative arrangements of one or more back-end file systems can be used in other embodiments.

The data mover module 406 in this embodiment is more particularly implemented as a parallel data mover comprising a plurality of storage adapters, one for interfacing the data mover module to each of the back-end file systems 430, 432 and 434. The storage adaptors include a storage adaptor for Isilon that includes PLFS functionality for interfacing with the Isilon platform providing the scale-out NAS cluster 432.

Associated with the HSM API 420 in this embodiment are a policy engine 440 and at least one symbolic link 450. The policy engine 440 is configured to monitor the state of the Lustre file system with regard to various policy-related parameters, and sends commands to the data mover module 406 via the HSM API 420. Such commands may, for example, direct that particular files be moved from the Lustre file system to the back-end file systems, or restored from the back-end file systems into the Lustre file system, in order to facilitate enforcement of specified policies or achievement of performance goals. A Lustre MDS is not explicitly shown in this figure but is informed by the data mover module 406 when a file is moved from the Lustre file system to the back-end file systems. Alternatively, the Lustre server 412 may be viewed as comprising both an OSS and an MDS. The Lustre MDS receives a pointer to the moved file in the back-end file systems. The moved file is assumed to be deleted in the Lustre file system and replaced with a corresponding instance of symbolic link 450. The symbolic link may comprise, for example, a link to a stub in the data mover module 406.

When a client such as an application running on a corresponding compute node of an HPC system requests a file that has been previously moved to the back-end file systems, the Lustre MDS sends a request to the data mover module 406 via the HSM API 420 to restore the file. The client sees the symbolic link including the file name of the requested file but cannot read the file until is has been restored from the back-end file systems into the Lustre file system via the data mover module 406.

FIG. 4 more particularly illustrates an exemplary arrangement in which a given file denoted "testfile" is stored across the Lustre OSTs of the front-end file system as respective file segments TF0, TF1, TF2, TF3, TF4 and TF5. The data mover module 406 is provided with information regarding the file layout on the Lustre file system via the HSM API 420. In this example, it is assumed that the file segments are each less than or equal to the maximum file size that can be accommodated in the back-end file systems. Accordingly, the data mover module 406 can preserve in the back-end file systems the file layout on the Lustre file system. In the figure, the testfile segments TFi stored on the OSTs OSTi, where $0 \leq i \leq 5$, are directly distributed as corresponding back-end segments SFi over the back-end file systems 430, 432 and 434, without any splitting of the segments into sub-segments.

The file segments are illustratively distributed using round robin distribution, such that file segment SF0 is stored on file system 430, file segment SF1 is stored on file system 432, file segment SF2 is stored on file system 434, file segment SF3 is stored on file system 430, and so on as shown in the figure. The file names utilized for the file segments as stored in the back-end file systems are illustratively as follows:
SF0=testfile.##HSML##. 00000000
SF1=testfile.##HSML##. 00000001
SF2=testfile.##HSML##0.00000002
. . .

The Lustre MDS associated with the Lustre OSS 412 provides a testfile stub that illustratively provides a pointer to a link denoted TFlink in data mover module 406. The link TFlink identifies a corresponding metadata file testfile.MD in the back-end file system 434. The metadata file testfile.MD includes information specifying the locations of the all the file segment of testfile in the back-end file systems, as well as other information that can be utilized to reconstruct the original testfile layout on the Lustre file system.

For example, as shown in the figure, the metadata file testfile.MD may include information be of the following form:
SF0@IPa#TF0@OST0&Off;
SF1 @IPb#TF1 @OST1 &Off;
SF2@IPc#TF2@OST2&Off;
SF3@IPa#TF3@OST3&Off;
. . .

In this example, IPa, IPb and IPc are IP addresses associated with the respective back-end file systems 430, 432 and 434, and Off denotes an offset. As indicated above, the file segments are assigned to the back-end file systems using round robin distribution.

Figure 5:
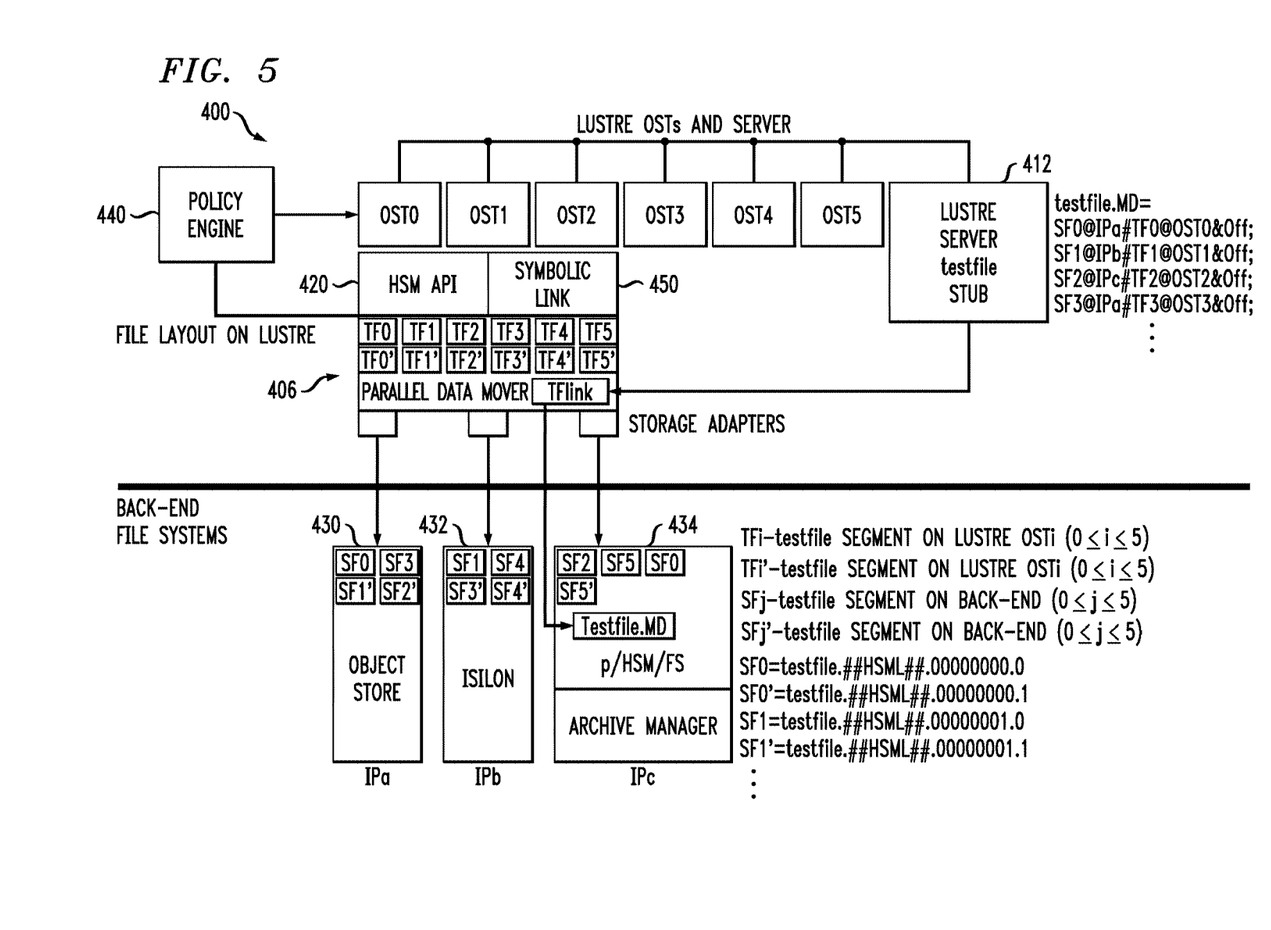

Referring now to FIG. 5, the information processing system 400 is illustrated in an arrangement in which the given file testfile to be moved from the front-end Lustre file system to the back-end systems includes file segments that are greater than the maximum file size of the back-end file systems. In this example, each Lustre OST is assumed to store a single file segment that is separated into two sub-segments by the data mover module for storage in the back-end file systems. Thus, sub-segments TF0 and TF0' are both stored as a single segment on OST0, sub-segments TF1 and TF1' are both stored as a single segment on OST1, sub-segments TF2 and TF2' are both stored as a single segment on OST2, and so on. The corresponding sub-segments are stored by the data mover module 406 in the back-end file systems using file names of the following form:
SF0=testfile.##HSML##0.00000000.0
SF0'=testfile.##HSML##0.0000000000.1
SF1=testfile.##HSML##0.00000001.0
SF1'=testfile.##HSML##0.00000001.1
. . .

In this example, the 8 digit namespace extension utilized in FIG. 4 is further extended to include an additional final digit that identifies a particular sub-segment within a given one of the file segments. It should be noted that the distribution of the sub-segments over the back-end file systems in this example deviates slightly from a strict round robin distribution, although strict round robin distribution or other types of distributions of sub-segments across the back-end file systems can be used in other embodiments.

The configuration of the metadata file testfile.MD and other aspects of the operation of the information processing system 400 in the FIG. 5 embodiment are otherwise substantially the same as previously described in the context of FIG. 4.

It should be understood that the particular front-end and back-end file system arrangements and their associated file, segment, sub-segment and metadata formats as illustrated FIGS. 4 and 5 are presented by way of illustrative example only, and should not be construed as limiting in any way.

As another example, segments or sub-segments of a given file that is split for movement from a front-end file system to a back-end file system under the control of a data mover module can be written to a single back-end file system directory that includes the name of the given file. More particularly, a 20 TB file Checkpoint1 stored on a front-end file system comprising a Lustre file system can be split into files seg1.1 TB.00000001, seg2.1 TB.00000002 and so on to be written to a back-end file system implemented using Isilon platform nodes in a directory /mnt/lustre/checkpoint1. Additional metadata information related to the layout of the Checkpoint1 file in the Lustre file system can be added in a /mnt/lustre/checkpoint1 directory that will allow the data mover module to restore the file back to the Lustre file system in same layout form as it was originally written.

The embodiments of FIGS. 1, 3, 4 and 5 may be viewed as exemplary arrangements in which a data mover module is implemented as a parallel data mover controlling movement of data between front-end and back-end file systems based on information received via an HSM API. A given such file system can be essentially any type of file system, including Lustre, Ceph, GPFS, HDFS and numerous others, as well as combinations thereof.

The disclosed arrangements can be used to construct a high-performance cluster file system using any underlying physical file system. Moreover, the use of a data mover module arranged between a front-end file system and a back-end file system to communicate with an HSM API of the front-end file system significantly expands the number and type of HSM targets that may be used, thereby substantially improving system flexibility.

Furthermore, some embodiments disclosed herein allow multiple applications running on respective compute nodes to write to a single file stored across multiple scale-out NAS cluster nodes or other types of back-end file systems with reduced locking contentions.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

It is to be appreciated that the particular file system and processing device arrangements and associated storage functionality illustrated in FIGS. 1-5 are exemplary only, and numerous other arrangements may be used in other embodiments.

For example, the disclosed techniques may be adapted in a straightforward manner for providing efficient access to data distributed over more than two distinct types of storage tiers, including a wide variety of storage tiers other than the OSS tiers and scale-out NAS cluster tiers described in conjunction with the FIG. 1 embodiment.

It was noted above that portions of the information processing system 100 may be implemented using one or more processing platforms. Illustrative embodiments of such platforms will now be described in greater detail. Although described in the context of system 100, these platforms may also be used to implement at least portions of the information processing systems of FIGS. 3, 4 and 5, as well as other information processing systems in other embodiments of the invention.

Figure 6:
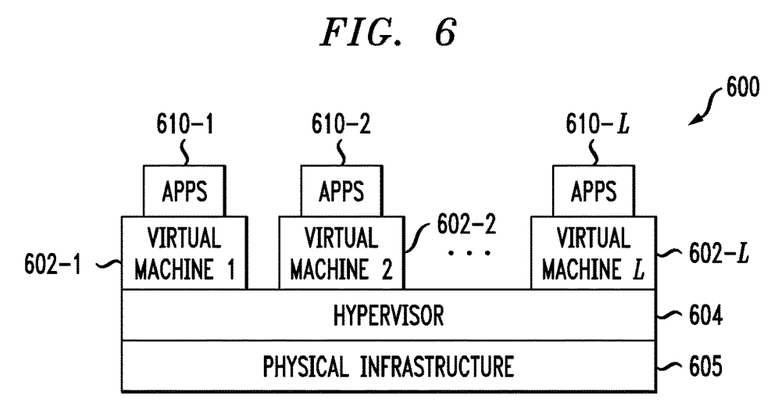
FIGS. 6 and 7 show examples of processing platforms that may be utilized to implement at least a portion of each of the information processing systems of FIGS. 1 and 3-5.
Figure 7:
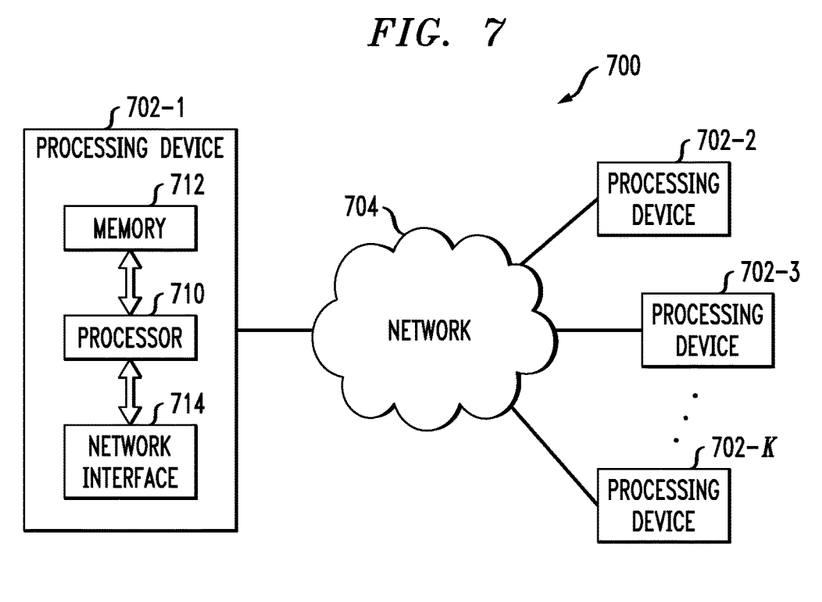

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of a burst buffer appliance or other component of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 722 may comprise random access memory (RAM), read-only memory (ROM) or other types of memory, in any combination. The memory 722 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a data mover module or an associated front-end or back-end file system as disclosed herein can be implemented at least in part in the form of one or more software programs stored in memory and executed by a processor of a processing device such as one of the virtual machines 602 or one of the processing devices 702. For example, the data mover module 106 and the HSM API 120 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, file systems and computer systems that can benefit from the enhanced flexibility provided in hierarchical storage management. Also, the particular configurations of system and device elements shown in FIGS. 1 and 3-7 can be varied in other embodiments. Thus, for example, the particular type of front-end file system and back-end file system deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
 a front-end file system comprising a hierarchical storage management application programming interface;
 a back-end file system comprising a scale-out network attached storage cluster comprising a plurality of nodes; and
 a data mover module arranged between the front-end and back-end file systems and adapted for communication with the hierarchical storage management application programming interface of the front-end file system;
 wherein the data mover module is configured to control movement of data between the front-end file system and the back-end file system responsive to information received via the hierarchical storage management application programming interface;
 wherein the data mover module in conjunction with controlling the movement of data between the front-end file system and the back-end file system is configured:
  to determine whether a given file received from the front-end file system is larger than a maximum file size permitted by one or more nodes of the scale-out network attached storage cluster;
  to split the given file received from the front-end file system into multiple smaller files for storage in the back-end file system responsive to determining that the given file is larger than the maximum file size permitted by one or more nodes of the scale-out network attached storage cluster; and
  to associate with each of the smaller files a corresponding file extension from a designated namespace so as to permit the given file to be reconstructed upon retrieval of the smaller files from the back-end file system;
 wherein the designated namespace comprises a first portion identifying a type of file system utilized by the front-end file system and a second portion identifying at least one of a segment of the given file and a sub-segment of the given file; and
 wherein the data mover module is implemented using at least one processing device comprising a processor coupled to a memory.

2. The apparatus of claim 1 wherein the back-end file system is of a different type than the front-end file system.

3. The apparatus of claim 1 wherein the front-end file system comprises a Lustre file system.

4. The apparatus of claim 1 further comprising a plurality of back-end file systems with the data mover module being configured to control movement of data between the front-end file system and each of the back-end file systems responsive to information received via the hierarchical storage management application programming interface.

5. The apparatus of claim 4 wherein the plurality of back-end file systems comprise at least one object store and at least one scale-out network-attached storage cluster.

6. The apparatus of claim 1 wherein the front-end file system and back-end file system are associated with respective different sets of one or more hierarchical storage tiers for use in hierarchical storage management.

7. The apparatus of claim 1 further comprising a plurality of compute nodes coupled to the front-end file system.

8. The apparatus of claim/wherein the data mover module is implemented at least in part utilizing software running on the compute nodes.

9. The apparatus of claim 1 wherein the data mover module comprises a plurality of server nodes that are synchronized with one another utilizing a message passing interface (MPI) protocol.

10. The apparatus of claim 1 wherein the data mover module is implemented at least in part utilizing a virtual layer of a parallel log-structured file system (PLFS).

11. The apparatus of claim 1 wherein the virtual layer comprises PLFS middleware configured to migrate files between the front-end and back-end file systems.

12. A processing platform comprising the apparatus of claim 1.

13. A method comprising:
configuring a data mover module for arrangement between a front-end file system and a back-end file system;
adapting the data mover module for communication with a hierarchical storage management application programming interface of the front-end file system; and
controlling movement of data between the front-end file system and the back-end file system responsive to information received in the data mover module via the hierarchical storage management application programming interface;
wherein the back-end file system comprises a scale-out network attached storage cluster comprising a plurality of nodes;
wherein controlling movement of data between the front-end file system and the back-end file system further comprises:
determining whether a given file received from the front-end file system is larger than a maximum file size permitted by one or more nodes of the scale-out network attached storage cluster;
splitting the given file received from the front-end file system into multiple smaller files for storage in the back-end file system responsive to determining that the given file is larger than the maximum file size permitted by one or more nodes of the scale-out network attached storage cluster; and
associating with each of the smaller files a corresponding file extension from a designated namespace so as to permit the given file to be reconstructed upon retrieval of the smaller files from the back-end file system; and
wherein the designated namespace comprises a first portion identifying a type of file system utilized by the front-end file system and a second portion identifying at least one of a segment of the given file and a sub-segment of the given file;
wherein the configuring, adapting and controlling are implemented using at least one processing device comprising a processor coupled to a memory.

14. The method of claim 13 wherein configuring the data mover module comprising implementing the data mover module at least in part utilizing a virtual layer of a parallel log-structured file system (PLFS).

15. An article of manufacture comprising a non-transitory processor-readable storage medium having stored therein program code of one or more software programs, wherein the program code when executed by at least one processing device causes said at least one processing device:
to configure a data mover module for arrangement between a front-end file system and a back-end file system;
to adapt the data mover module for communication with a hierarchical storage management application programming interface of the front-end file system; and
to control movement of data between the front-end file system and the back-end file system responsive to information received in the data mover module via the hierarchical storage management application programming interface;
wherein the back-end file system comprises a scale-out network attached storage cluster comprising a plurality of nodes;
wherein controlling movement of data between the front-end file system and the back-end file system further comprises:
determining whether a given file received from the front-end file system is larger than a maximum file size permitted by one or more nodes of the scale-out network attached storage cluster;
splitting the given file received from the front-end file system into multiple smaller files for storage in the back-end file system responsive to determining that the given file is larger than the maximum file size permitted by one or more nodes of the scale-out network attached storage cluster; and
associating with each of the smaller files a corresponding file extension from a designated namespace so as to permit the given file to be reconstructed upon retrieval of the smaller files from the back-end file system; and
wherein the designated namespace comprises a first portion identifying a type of file system utilized by the front-end file system and a second portion identifying at least one of a segment of the given file and a sub-segment of the given file.

16. An information processing system comprising:
a computer system comprising a plurality of compute nodes; and
a cluster file system coupled to the computer system, the cluster file system comprising:
a front-end file system comprising a hierarchical storage management application programming interface;
a back-end file system comprising a scale-out network attached storage cluster comprising a plurality of nodes; and
a data mover module arranged between the front-end and back-end file systems and adapted for communication with the hierarchical storage management application programming interface of the front-end file system;
wherein the data mover module is configured to control movement of data between the front-end file system and the back-end file system responsive to information received via the hierarchical storage management application programming interface of the front-end file system;
wherein the data mover module in conjunction with controlling the movement of data between the front-end file system and the back-end file system is configured:
to determine whether a given file received from the front-end file system is larger than a maximum file size permitted by one or more nodes of the scale-out network attached storage cluster;
to split the given file received from the front-end file system into multiple smaller files for storage in the back-end file system responsive to determining that the given file is larger than the maximum file size permitted by one or more nodes of the scale-out network attached storage cluster; and to associate with each of the smaller files a corresponding file extension from a designated namespace so as to permit the given file to be reconstructed upon retrieval of the smaller files from the back-end file system;

wherein the designated namespace comprises a first portion identifying a type of file system utilized by the front-end file system and a second portion identifying at least one of a segment of the given file and a sub-segment of the given file; and wherein the information processing system is implemented by at least one processing device comprising a processor coupled to a memory.

17. The apparatus of claim 1 wherein the data mover module is further configured to generate one or more metadata files in conjunction with the split of the given file, and to store the one or more metadata files in the back-end file system, wherein the one or more metadata files indicate a manner in which the smaller files are distributed over multiple nodes of the back-end file system.

18. The method of claim 13 wherein the data mover module is further configured to generate one or more metadata files in conjunction with the split of the given file, and storing the one or more metadata files in the back-end file system, wherein the one or more metadata files indicate a manner in which the smaller files are distributed over multiple nodes of the back-end file system.

19. The system of claim 16 wherein the data mover module is further configured to generate one or more metadata files in conjunction with the split of the given file, and store the one or more metadata files in the back-end file system, wherein the one or more metadata files indicate a manner in which the smaller files are distributed over multiple nodes of the back-end file system.

20. The apparatus of claim 1, wherein the front-end data system comprises one or more object storage targets, the one or more object storage targets of the front-end data system having a maximum file size greater than the maximum file size of permitted by one or more of the nodes of the scale-out network attached storage cluster of the back-end data system.

* * * * *

UNITED STATES PATENT AND TRADEMARK OFFICE
CERTIFICATE OF CORRECTION

PATENT NO. : 10,007,673 B1
APPLICATION NO. : 14/138297
DATED : June 26, 2018
INVENTOR(S) : Sorin Faibish et al.

Page 1 of 1

It is certified that error appears in the above-identified patent and that said Letters Patent is hereby corrected as shown below:

In the Specification

Column 9, Line 32, please delete "IISM" and replace it with --HSM--

Column 16, Line 63, please delete "memory 722" and replace it with --memory 712--

Column 16, Line 65, please delete "memory 722" and replace it with --memory 712--

In the Claims

Claim 8, Column 18, Line 65, please delete "claim/wherein" and replace it with --claim 7 wherein--

Claim 13, Column 19, Line 47, please delete "and"

Claim 13, Column 19, Line 52, please add --and-- at the end of the line

Claim 14, Column 19, Line 57, please delete "comprising" and replace it with --comprises--

Claim 20, Column 22, Line 19, please delete "size of permitted" and replace it with --size permitted--

Signed and Sealed this
Twenty-eighth Day of May, 2019

Andrei Iancu
*Director of the United States Patent and Trademark Office*